United States Patent [19]

Bergkvist

[11] Patent Number: 4,614,167
[45] Date of Patent: Sep. 30, 1986

[54] COMBUSTION CHAMBER HAVING BEDS LOCATED ONE ABOVE THE OTHER AND A METHOD OF CONTROLLING IT

[75] Inventor: Jörgen Bergkvist, Finspong, Sweden

[73] Assignee: Asea Stal AB, Sweden

[21] Appl. No.: 799,074

[22] Filed: Nov. 18, 1985

[30] Foreign Application Priority Data

Nov. 16, 1984 [SE] Sweden ................................ 8405746

[51] Int. Cl.⁴ .............................................. B09B 3/00
[52] U.S. Cl. ................................... 122/4 D; 110/245; 165/104.16; 422/142
[58] Field of Search ....................... 122/4 D; 110/245; 165/104.16; 422/142

[56] References Cited

U.S. PATENT DOCUMENTS

| | | | |
|---|---|---|---|
| 3,431,892 | 3/1969 | Godel | 122/4 D |
| 3,823,693 | 7/1974 | Bryers et al. | 122/4 D |
| 3,902,462 | 9/1975 | Bryers | 122/4 D |
| 4,279,205 | 7/1981 | Perkins et al. | 110/245 |
| 4,476,816 | 10/1984 | Cannon et al. | 122/4 D |

FOREIGN PATENT DOCUMENTS

868710 5/1961 United Kingdom .
1473399 5/1977 United Kingdom .

*Primary Examiner*—Edward G. Favors
*Attorney, Agent, or Firm*—Pollock, Vande Sande & Priddy

[57] ABSTRACT

A boiler plant with a multi-fluidized-bed combustion chamber comprising a first bed in a lower combustion space and a second bed in an upper combustion space and with nozzles in the support means for the beds for injection of combustion air into the first bed and combustion gases into the second bed for fluidization of the bed material therein. The plant is equipped with bed material transport devices for transferring bed material from the lower combustion chamber to the upper combustion chamber or vice versa. Further, measuring means is provided for measuring the temperature and depth of the lower bed, and signal processing and control means are provided for adapting the depth of the lower bed in dependence on plant load and bed temperature.

10 Claims, 5 Drawing Figures

4,614,167

COMBUSTION CHAMBER HAVING BEDS LOCATED ONE ABOVE THE OTHER AND A METHOD OF CONTROLLING IT

FIELD OF THE INVENTION

This invention relates to the control of the thermal power output from series-operated fluidized bed combustion chambers.

BACKGROUND OF THE INVENTION

The invention has reference to a boiler plant comprising a combustion chamber with two or more combustion chamber spaces, one located above the other, with fluidized beds for combustion of a fuel and preferably also the removal of sulfur included in the fuel. Fuel is supplied to a first fluidized bed in a first combustion chamber space. Combustion gases and unburnt fuel particles and light ash particles, accompanying the combustion gases, flow through nozzles up into a second bed in a second combustion chamber space. The major part of the combustion takes place in the first bed. The unburnt fuel which accompanies the combustion gases to the second bed is burnt in the second bed.

The bed material in the beds normally consists of coal ash and possible quartz sand and, when desulfurization of sulfur-rich fuel is aimed at, also partially of a sulfur absorbent such as limestone or dolomite. The sulfur absorbent may be supplied to one of or all of the beds, but is preferably supplied to the second or uppermost bed. The bed material has such a granular size when being supplied to the combustion chamber that it forms beds having suitable fluidizing properties and is not blown away by the fluidizing gas.

Multibed combustion chambers comprising series arranged fluidized beds are known, for example, from U.S. Pat. No. 4,279,207.

A condition for obtaining good performance during combustion in a fluidized bed is that the temperature be maintained within rather close limits in the face of varying bed depth and changing energy outputs from the boiler plant. The lowest combustion chamber includes a nest of tubes submerged in the bed through which tubes flowing coolant removes more than half of the energy of the boiler plant. The tube nest also cools the bed material so that overheating thereof is prevented. To prevent the tube nest, under conditions of partial load, from cooling down the bed to a temperature below the temperature which is necessary for maintaining fuel combustion, the bed level is lowered so that an appropriate number of layers in the tube nest will be situated above the bed surface. The cooling effect of the tube nest on the bed material is then reduced.

In known multibed combustion chambers, to control depth of bed material, bed material is discharged from the lower bed (where the greater part of the combustion takes place). Discharged bed material is stored during partial load operation in a storage space located outside the actual combustion chamber. According to U.S. Pat. No. 4,279,207, material discharged from a bed is stored in a space below the combustion chamber space containing the combustion bed. The bed material in this storage space is maintained in fluidized condition by the combustion air and will thus be cooled by the air. When the bed material comes to be fed back into the combustion bed upon an increase in power demand, it is cooled bed material that will be fed back. The necessary reheating of the returned bed material delays the rate of power increase possible in the plant, so that this rate is lower than it would be were the bed material to be returned at substantially the same temperature as that existing in the bed.

OBJECT OF THE INVENTION

One object of the invention is to provide a multibed combustion chamber having improved load control properties and a method of controlling the load and the temperature in such a combustion chamber.

SUMMARY OF THE INVENTION

According to the invention the above-mentioned object is achieved by having a substantially constant amount of bed material in the combustion chamber and providing the combustion chamber with at least one transport device for transferring bed material between the beds, that is, from the lower bed to the upper bed and inversely. Further, pressure transducers are provided to sense the bed height and temperature transducers are provided to sense the temperature in the first bed of the combustion chamber (i.e. the actual combustion bed). These pressure and temperature transducers are connected to signal processing and control equipment for controlling the amount of bed material in the first bed with regard to the current load requirement of the plant and for maintaining substantially constant the total amount of bed material present. This is achieved by transporting bed material in either direction between the first and the second bed and by the discharge of bed material from one of the beds. The invention also relates to a method of controlling the load by means of the above-mentioned transducers and the signal processing and control equipment connected to the transducers.

What particularly characterized the invention will become clear from the appended claims.

BRIEF DESCRIPTION OF THE DRAWINGS

The invention will now be described in greater detail, by way of example, with reference to the accompanying drawings, in which.

DESCRIPTION OF THE PREFERRED EMBODIMENT

Figure 1:
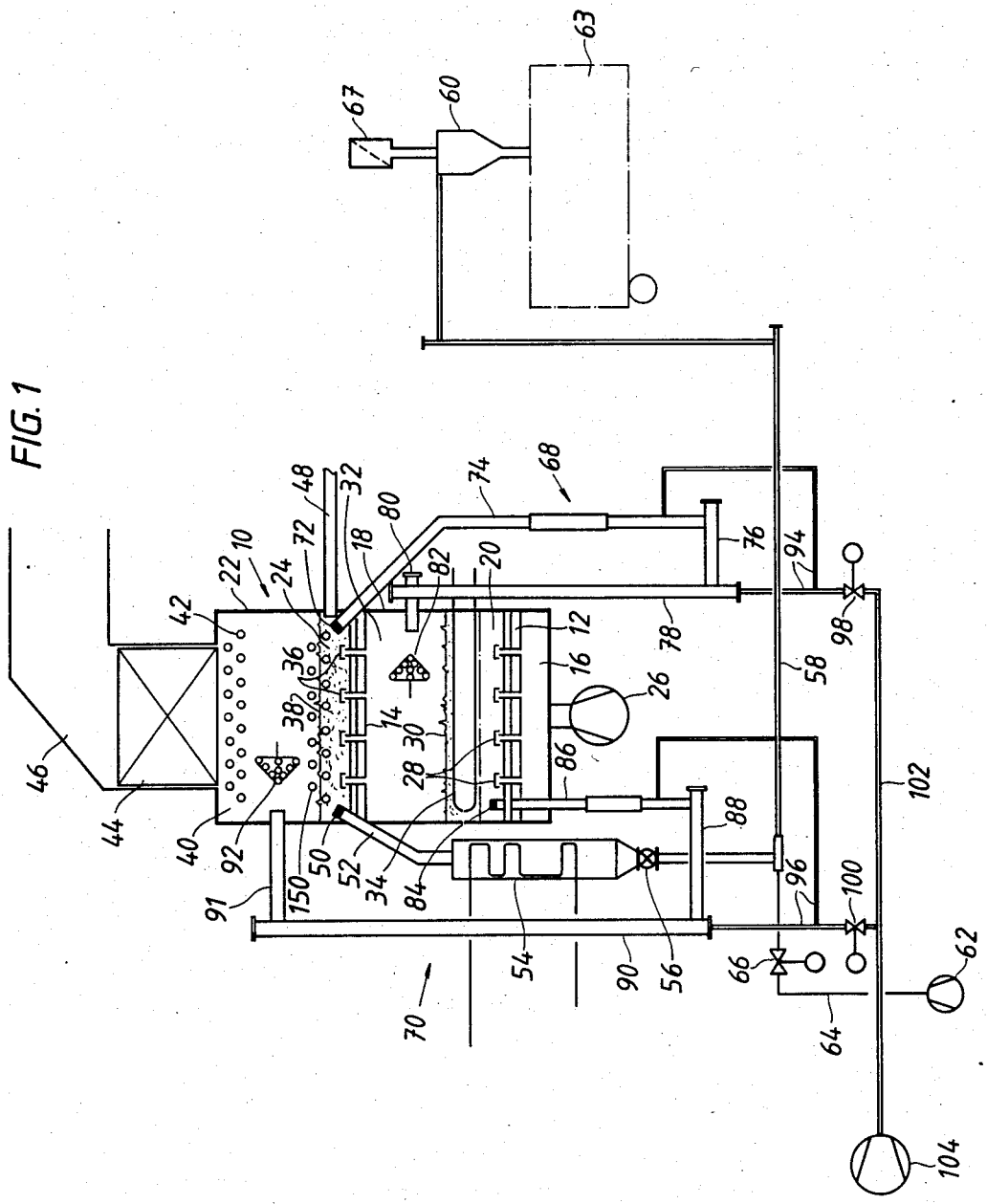
FIG. 1 shows schematically a boiler plant for a two-bed combustion chamber and the auxiliary equipment which is necessary for the proper operation and control of the combustion chamber.

In FIG. 1, 10 designates a combustion chamber having two cooled bottom support means 12 and 14, which divide the combustion chamber 10 into an air plenum chamber 16, a first combustion chamber space 18, containing a first fluidized bed 20, and a second combustion chamber space 22 containing a second fluidized bed 24. The plenum chamber 16 is supplied with combustion air from a fan or compressor 26. The fan or compressor is operated by a motor 27 (shown in FIGS. 2 and 3) whose rotational speed can be controlled. Combustion air is supplied to the first combustion chamber space 18 via a number of nozzles 28 and fluidizes the bed material in the first bed 20 and burns fuel supplied to the first bed. The nozzles 28 are formed so as to prevent bed material from flowing down into the air plenum chamber 16. A free space 32 is provided above the upper surface 30 of the first bed 20, where combustion gases are collected. The first bed 20 includes a nest of tubes 34 for cooling the first bed and heating of water fed therethrough (e.g. for the generation of steam).

The bottom support means 14 of the second bed 24 is provided with nozzles 36 through which combustion gases are supplied to the second combustion chamber space 22 and fluidize the material in the second bed 24. An uncooled nest of tubes 150 is provided in the second bed 24 which reduces the size of gas bubbles in the second bed and reduces the amount of bed material thrown up from the upper surface 38 of the second bed. A free space 40 is arranged above the upper surface 38 of the second bed 24. In the upper part of the free space 40 there may be arranged one or more layers of rods, uncooled or cooled tubes 42, which are intended to decelerate ash and bed material and to prevent this material from becoming entrained with the combustion gases when the latter leave the chamber space 22 and flow into a subsequent flue gas cooler 44. From the flue gas cooler 44, the gases are forwarded along the duct 46 to an economizer (not shown) and from there to a cleaning plant (also not hown) for separation of dust before the gases are led to a chimney.

The first bed 20 is a combustion bed in which the main part of the supplied fuel is burnt. The bed material may be inert and, for example, could consist of sand and ashes, formed during the combustion, but it may also contain a sulfur absorbent to a greater or lesser extent. From the point of view of securing good operating conditions, particularly with regard to preventing clogging of the nozzles 28 in the bottom support means 14, it may be convenient for the bed 20 to consist of a major part of substantially inert material with admixed ash and only to a minor extent of sulfur absorbent.

The second bed 24 is a sulfur absorption and aftercombustion bed, in which unburnt fuel accompanying the gases from the free space 32 are burnt. The second bed 24 consists of coal ash and possibly quartz sand and, in the case of desulfurization, also of granular calcium-containing material, for example limestone or dolomite. Absorbent is supplied to the second bed through an inlet conduit 48 in dependence on the amount of sulfur in the fuel supplied to the first bed 20. Consumed bed material and ash, which do not accompany gases leaving the free space 40, are removed by discharging material from the second bed 24. The removed solid material is discharged via a coarse filter 50 into a tube 52 leading to an ash cooler 54. From the cooler 54, the solid material is sluiced, via a rotary vane feeder 56, to a conveying pipe 58 through which it is transported pneumatically to a separator 60 and then into a collecting container 63. The pipe 58 is supplied with transport air from a fan or compressor 62, via a conduit 64 fitted with a control valve 66.

The combustion chamber 10 is provided with a first transport device 68 for transferring hot bed material downwardly from the second bed 24 to the first bed 20 and a second transport device 70 for transferring hot bed material upwardly from the first bed 20 to the second bed 24.

The transport device 68 includes a coarse filter 72 for separation of oversize slag lumps and the like, and a vertical tube 74, a horizontal tube 76 (which together with the tube 74 forms an L-valve), a vertical conveyor tube 78 and a horizontal feeding tube 80. Opposite to the outlet from the tube 80, there is located a distribution device 82 which spreads fed-in bed material in such a way as to avoid erosion and limit localised destruction of the fluidization in the bed 20 during the feeding-in operation.

The transport device 70 includes a coarse filter 84, a vertical tube 86, a horizontal tube 88 (which together with the tube 86 forms an L-valve), a vertical conveyor tube 90 and a feeding tube 91. In front of the outlet from the feeding tube 91 there is located a distribution device 92 for distributing the transferred bed material over a larger surface of the bed 24 in order to limit local erosion and disturbance of the fluidization in the bed 24. The transport devices 68 and 70 are connected via conduits 94 and 96, respectively, valves 98 and 100, respectively, and conduit 102, to a compressor 104 which supplies the transport devices 68, 70 with transport air. In large plants a plurality of parallel-operating transport devices may be required.

Figure 2:
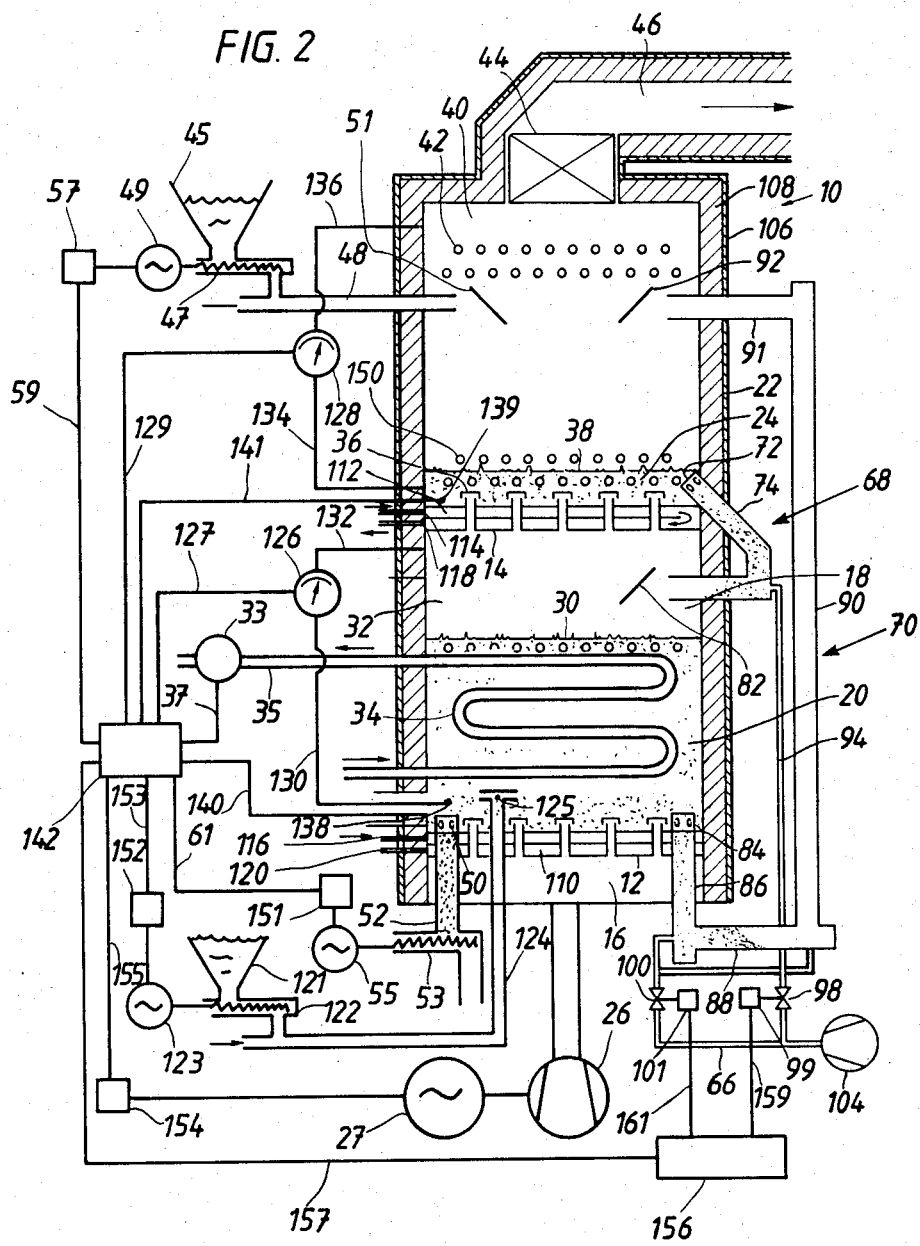
FIG. 2 shows the combustion chamber in operation at full power.
Figure 3:
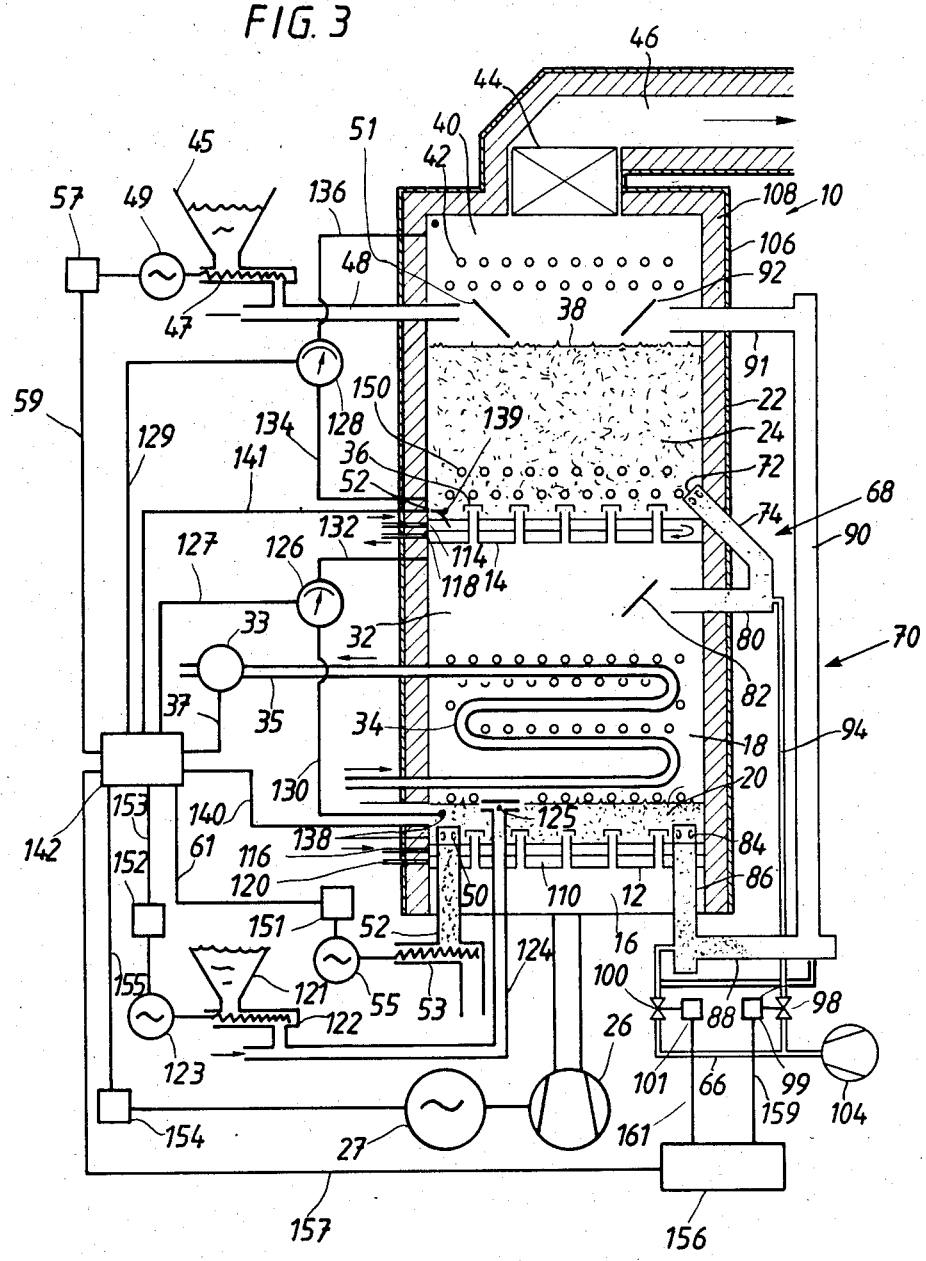
FIG. 3 shows the combustion chamber in operation at reduced power.

FIGS. 2 and 3 show a combustion chamber which is of somewhat different design from that shown in FIG. 1, and in addition it is drawn to a larger scale and thus shows further details. FIG. 2 shows the combustion chamber 10 at full load and FIG. 3 shows the combustion chamber 10 at low load.

The combustion chamber 10 shown in FIGS. 2 and 3 has walls which are thermally insulated. The walls consist of an outer casing 106, which could, for example, be water-cooled, and an internally applied layer of insulation 108. The bottom support means 12 and 14 may be formed with cooling water channels 110 and 112, respectively. The bottom support means 14 is, furthermore, suitably formed with an air plenum (not shown) for the supply of secondary air to the first bed 24 and for air for cleaning the nozzles 36 to prevent clogging thereof. Cooling water is supplied through conduits 114, 116 and discharged through conduits 118, 120. As shown in FIGS. 2 and 3, bed material is fed into the upper free space 40 from a bed material container 45, via a supply means in the form of a screw feeder 47 and by pneumatic transportation in the conduit 48. The bed material consists of or contains sulfur absorbent. The screw feeder 47 is driven by a motor 49 capable of being operated at variable speeds. At the orifice of the conduit 48 a distributor 51 is provided for deflecting fed-in bed material. Alternatively, the bed material can be fed in via nozzles directly into the bed 24.

Fuel from a fuel container 121 is fed via a second supply means, in the form of a screw feeder 122 via a conduit 124 and nozzles 125, suitably one for each square meter of the area of the bottom 12, into the first bed 20. The screw feeder 122 is driven by a motor 123 with means for varying its speed. In the embodiment shown in FIGS. 2 and 3, bed material and ash are withdrawn from the lower or first bed 20. The outlet tube 52, in the embodiment according to FIGS. 2 and 3, is connected to a variable discharge device in the form of a screw feeder 53 which is driven by a variable speed motor 55. For measuring the pressure drop across the beds 20 and 24, difference pressure gauges 126 and 128 are provided. The manometer 126 is connected to the combustion chamber space 18 at a lower part of the first bed 20, via a conduit 130 and to the free space 32, via a conduit 132. The manometer 128 is connected to the combustion chamber space 22 at a lower part of the second bed 24, via a conduit 134 and to the free space 40, via a conduit 136. Further, a first temperature measuring device 138 is provided in the lower bed 20 and second temperature measuring device 139 is provided in the upper bed 24.

In a combustion chamber 10 of the above-described kind, combustion is substantially completed in the lower bed 20. Unburnt fuel, which leaves the lower bed 20, together with the combustion gases and is transported with these gases to the upper bed 24, is burnt in the upper bed. If the bed material in the lower bed 20 consists of inert material with respect to sulfur, the lower bed will be a pure combustion bed and sulfur is absorbed in the upper bed 24.

If the lower bed 20 contains a calcium-containing material such as lime or dolomite, sulfur will be absorbed in both beds. Considering, among other things, the risk of clogging of the nozzles 36, it may in certain cases, for example depending on the fuel used, be sufficient to use a sulfur absorbent in the upper bed 24 only.

The boiler comprises sensors which sense the actual load demanded. In a boiler plant for heating water or for the generation of steam, an outlet conduit 35 from the tube nest 34 includes a heating load indicator 33. The manometers 126 and 128, the temperature measuring means 138 and 139 and the heating load indicator 33 are all connected to a common signal processing unit 142 via connectios 127, 129 for pressure, 140, 141 for temperature and connection 37 for load. A control device 57 for controlling the speed of the motor 49, a control device 152 for controlling the speed of the motor 123, a control device 154 for controlling the speed of the compressor motor 27, a control device 151 for controlling the speed of the motor 55, and a control device 156 for operating the valves 98 and 100 are respectively connected to the signal processing equipment 142 via connections 59, 153, 155, 61 and 157. The control device 156 is connected to operating devices 99 and 101 which actuate the valves 98 and 100 via connections 159 and 161. By means of the control device 156 and the valves 98 and 100, the air flow for the transport of bed material between the combustion chamber spaces 18 and 22 is controlled. In the embodiment shown in FIGS. 2 and 3, the volume of air fed to the combustion chamber 10 is controlled by varying the rotational speed of the compressor 26. Alternatively, a compressor with a constant rotational speed may be used and the volume of air controlled by a valve which throttles the air flow.

As already mentioned, controlling the operating load of a boiler plant is more complicated if the plant employs a fluidized bed combustion chamber than is the case with a boiler plant of more normal kind. In a conventional non-fluidized bed boiler, the power is rapidly reduced when the supply of fuel and combustion air is reduced. Within the full power range of the plant, suitable conditions for the proper combustion of fuel can be maintained without difficulty.

In a boiler plant with a combustion chamber having one or more fluidized beds, a change in heating load necessitates control measures to keep the temperature in the or each combustion bed at a suitable level, normally at around 900° C. Variations within about +50° C. and −100° C. can usually be tolerated. The most appropriate temperature level is to some extent dependent on the fuel used. The purpose of the nest of tubes 34 in the first bed 20 is twofold, namely, (a) to heat water or generate steam and (b) to cool the bed so that its temperature is kept at a level suitable for the combustion reaction involved. If the temperature drops below a certain level, combustion cannot be maintained. If the temperature increases above a certain level, ash and possibly also bed material melt so that slag lumps are formed which can render continued operation of the plant impossible. In the case of a decrease in load, the height of the bed 20 must be reduced so that the upper surface 30 of the bed is lowered and a number of layers of tube in the tube nest 34 are exposed. At the same time, the supply of fuel and combustion air to the bed 20 is reduced. In case of an increase of load, the depth of the bed 20 is increased so that a larger part of the tube nest 34 will be surrounded by hot bed material. At the same time, the supply of fuel and combustion air to the bed is increased. Since the rate of heat transfer between bed material and tubes in the nest 34 is several times greater than the rate of heat transfer between the combustion gases and the tubes, a balance between the supply of heat and the cooling effect produced by the tube nest 34 can be achieved so that a desired temperature is maintained in the bed 20 despite varying loads.

Heretofore, material from the bed 20 has been moved between the bed and a container disposed outside the combustion chamber 10. This container may be located below the lower combustion chamber, as is shown in the specification of U.S. Pat. No. 4,279,207 previously referred to. In other known designs of plant, the container is located completely outside the actual combustion chambers.

When an increase in load arises, bed material must be supplied, as described above, to the lower bed so that an increased number of layers in the tube nest 34 will be surrounded by bed material. When meeting this requirement by feeding in cold bed material, large quantities of heat are absorbed in heating up the cold bed material and this makes it difficult to achieve a rapid load increase. To overcome this, in certain cases the storage containers have been provided with heating devices to pre-heat the bed material pending its supply to the bed on a load increase arising.

According to the invention, the plant is designed so that each of the lower combustion chamber space 18 and the upper combustion chamber space 22 can accommodate the full amount of bed material required at full load. The upper combustion chamber space 22 should house at least the bed material required for a minimum depth of the bed 24 and that amount of bed material which has to be transferred from the lower bed 20 when a maximum exposure of tubes in the tube nest 34 is called for.

In operation of the boiler plant, the total amount of bed material required for the two beds 20 and 24 is in all essential respect constant, and consequently the sum of the heights of the two beds 20 and 24 and the sum of the pressure drops across them are also in all essential respects constant. Upon a change of load, the air and fuel supply and the bed height in the lower bed 20 are changed. The heat absorption of the tube nest 34 is changed, in dependence on the proportions of the tube nest located in the bed 20 and located above the bed 20. By adapting the bed height to the heat absorption of the tube nest, the temperature of the bed 20 can be kept within the allowable limits and in practice is maintained as constant as possible. Depending on whether the load is increasing or decreasing, the control means 142 delivers a control impulse for transferring bed material from one combustion chamber to the other, by opening one or other of the air valves 98 or 100, thus obtaining transportation of bed material in the required direction.

In the case of a relatively small plant, the depth of the upper bed 24 in the case of maximum load, would be approximately 300 mm and the depth of the lower bed 20 would be approximately 700 mm. In the case of the minimum load, the corresponding values may be 650 mm and 350 mm, respectively. As mentioned, the aim of the transfer of material between the beds is to keep the temperature of the lower bed approximately constant throughout. However, the temperature of the upper bed will vary somewhat upon a change of load and will become lower with decreasing load because the combustion gases leaving the bed 20 will be being cooled to a greater extent by the exposed tube layers in the nest 34. In the bed material in the upper bed there is no cooling tube nest to compensate for this change. The temperature in the uper bed can, therefore, be kept permanently at a value which is almost as high as that sought to be maintained in the lower bed. Upon an increase of load, bed material can then be rapidly transferred from the upper bed to the lower bed without the combustion in the lower bed being disturbed by any significant temperature reduction. A rapid power increase can therefore be achieved.

A large quantity of solid material leaves the beds 20 and 24 with the flue gases. New material is supplied in the form of fuel and sulfur absorbent. The supply can exceed the rate of removal with the flue gases, so that the depths of both beds increase. The pressure drop across the beds is in all essential respects proportional to the total depth of bed material in a fluidized state within the chamber 10. The pressure drop measured by each of the differential pressure gauges 126, 128 is therefore a measure of the respective depths of the beds. The tapping off of superfluous bed material is controlled by control means which are connected to the signal processing unit 142, so that the total bed height is kept substantially constant and so that the depths of the individual beds will not exceed a maximum depth nor fall below a minimum depth, respectively.

For fluidization of the beds 20 and 24, a certain minimum air flow is required. This involves special problems in the case of low load operation. These problems will now be explained with reference to FIGS. 4 and 5.

Figure 4:
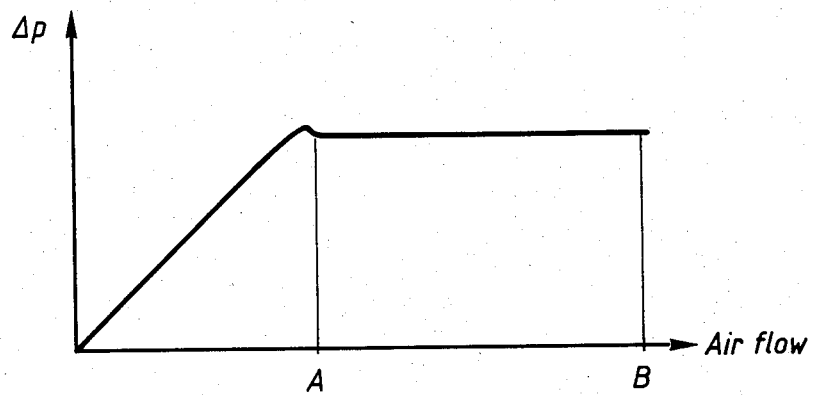
FIG. 4 shows the relationship between the air flow through the respective bed and the pressure drop.
Figure 5:
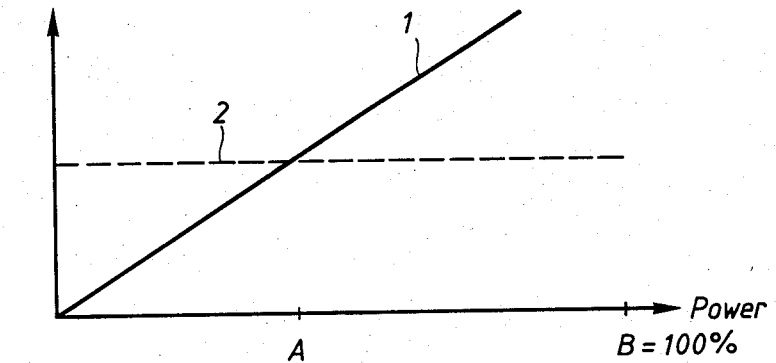
FIG. 5 shows the relationship between air flow and power.

As will be clear from the curve plotting pressure drop against air flow shown in FIG. 4, the pressure drop $\Delta p$ increases with increasing air flow until it reaches a constant value at the point A. The point B represents the air flow required for full power. FIG. 5 plots air flow against power and curve 1 in FIG. 5 (the unbroken line) shows the necessary air flow required for complete combustion of the fuel supplied. This increases linearly with increasing power. Curve 2 in FIG. 5 (the broken line) shows the necessary minimum air flow required to maintain fluidization and this is constant. This means that the air flow in the upper power range (between A and B) can be chosen with regard to the actual air requirement for complete combustion whereas in the lower power range, (below point A) the air flow must be chosen with regard to the conditions for satisfactory fluidization. In the lower load range the air flow requirement means that the combustion chamber 10 must be operated with an excess of air, which excess increases with decreasing power otherwise the combustion chamber must be operated intermittently. In practice, the points A in FIGS. 4 and 5, can be set at about 50% power. Points B in both Figures represent full power.

The devices included in the control equipment, such as the signal processing unit 142 and the control means 151, 57, 152, 154 and 156, may be of standard design. They may be of a make sold under the trade marks MICON, ASEA-MASTER or NOVA TUNE, or under the designation SAAB PCC 963.

The invention is not limited to the specific arrangements illustrated in the drawings, since many changes could be made thereto within the scope of the following claims. In particular it should be noted that although two beds only are illustrated and described, the invention does not extend to more than two series-disposed beds and the bed material transport means is suitably provided to transfer bed material from any of the upper beds to the lowest bed and vice versa.

What is claimed is:

1. A boiler plant provided with a multibed combustion chamber, which combustion chamber includes
    a first lower combustion chamber space delimited by a first bottom support means adapted to support a first bed of fluidizable bed material and housing a nest of tubes for extracting heat from the first bed material,
    a second upper combustion chamber space delimited by a second bottom support means adapted to support a second support bed of fluidizable bed material,
    an air plenum chamber below the first bottom support means,
    nozzles in the first bottom support means for transferring combustion air from the air plenum chamber to the first lower combustion chamber space,
    means to feed fuel to the first combustion chamber space, and
    nozzles in the second bottom support means for transferring combustion gases from the first lower combustion chamber space to the second upper combustion chamber space,
    which plant further includes
    a first bed material transport means for transferring bed material downwardly from the second upper combustion chamber space to the first lower combustion chamber space,
    a second bed material transport means for transferring bed material upwardly from the first lower combustion chamber space to the second upper combustion chamber space,
    measuring means for measuring the actual thermal load outputting from the plant, and
    control means for controlling the depth of bed material in the lower combustion chamber space in dependence on the measured thermal output load by transferring bed material from one combustion chamber to the other via one of said first and second bed material transport means.

2. A boiler plant according to claim 1, in which said first and second bed material transport means are of the same type.

3. A boiler plant according to claim 1, in which at least one of said first and second bed material transport means comprises a plurality of parallel-working material transport devices.

4. A boiler plant according to claim 1, which further includes
    measuring means for determining the depth of each of the first and second beds, a signal processing unit in which the measured values for the bed depths are compared with desired values for the load required to be delivered from the plant at a particular time, and control means for controlling the transportation of bed material in one of said first and second bed material transport means to effect the transfer of bed material from one bed to the other.

5. A boiler plant according to claim 4, in which the measuring means for the bed depths consists of a differential pressure gauge for each bed, each gauge being connected between a lower part of the respective combustion chamber space and the free-space above the respective bed.

6. A boiler plant according to claim 4, which includes further measuring means to measure the temperature of the first bed, which further measuring means is connected to the signal processing unit, where the measured value of the bed temperature is compared with a desired value therefor.

7. A method of controlling a boiler plant having a multibed combustion chamber including a first lower combustion chamber space containng a first fluidizable bed of bed material and with a nest of tubes at least partly submerged in the bed material for extracting heat from the first bed, a second upper combustion chamber space with a second upper fluidizable bed of bed material, an air plenum chamber below the first bed, nozzles in a bottom support means of the first bed for transferring combustion air from the air plenum chamber to the first combustion chamber space, nozzles in a bottom support means of the second combustion chamber space for transferring combustion gases from the first combustion chamber space to the second combustion chamber space, and means to feed fuel to be burnt to the first bed, wherein the temperature of the first bed material is maintained, throughout a power output range of the plant, between upper and lower temperature limits, within which suitable combustion of the fuel can occur, by adapting the depth of bed material in the lower combustion chamber space to the required thermal output of the plant by transferring bed material from one bed to the other bed, so that the cooling power of that part of the tube nest which is submerged in the first bed is adapted to the thermal power generated in the first bed.

8. A method according to claim 7, in which the sum of the depths of bed material in the two beds is held substantially constant independent of the thermal output of the plant.

9. A method according to claim 7, in which the depth of fluidized bed material in each bed is measured by measuring the pressure drop occurring across the respective bed.

10. A method according to claim 7, in which measurement signals indicative of the thermal output of the plant, the temperature in the first bed and the respective depths of fluidized bed material in the two beds are supplied to signal processing equipment which compares these values with desired values for the required thermal output of the plant and influences control means to effect transfer of bed material from one bed to the other bed in dependence on the magnitude and direction of deviations between the measured and required values.

* * * * *